United States Patent
D'Alterio et al.

(10) Patent No.: US 10,417,410 B2
(45) Date of Patent: Sep. 17, 2019

(54) ACCESS CONTROL TO PROTECTED RESOURCE BASED ON IMAGES AT CHANGING LOCATIONS IDENTIFIABLE BY THEIR TYPE

(71) Applicant: INTERNATIONAL BUSINESS MACHINES CORPORATION, Armonk, NY (US)

(72) Inventors: Domenico D'Alterio, Rome (IT); Giuseppe Longobardi, Naples (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 233 days.

(21) Appl. No.: 15/469,930

(22) Filed: Mar. 27, 2017

(65) Prior Publication Data
US 2018/0276365 A1    Sep. 27, 2018

(51) Int. Cl.
*G06F 21/36*    (2013.01)
*H04M 1/67*    (2006.01)
*H04W 12/08*    (2009.01)
*H04W 12/06*    (2009.01)

(52) U.S. Cl.
CPC .............. *G06F 21/36* (2013.01); *H04M 1/67* (2013.01); *H04W 12/06* (2013.01); *H04W 12/08* (2013.01)

(58) Field of Classification Search
CPC ........ G06F 21/36; G06F 3/0486; G06F 3/041; G06F 3/04883; G06F 3/04886; H04W 12/08; H04W 12/06; H04M 1/673; H04M 1/67
See application file for complete search history.

(56) References Cited

U.S. PATENT DOCUMENTS

| | | | |
|---|---|---|---|
| 8,286,103 B2 | 10/2012 | Chaudhri et al. | |
| 8,966,617 B2 | 2/2015 | Hicks et al. | |
| 9,158,399 B2 | 10/2015 | Lu | |
| 9,292,678 B2 | 3/2016 | Keohane et al. | |
| 2002/0188872 A1* | 12/2002 | Willeby | G06F 3/04886 726/7 |

(Continued)

OTHER PUBLICATIONS

Henry, Alan, "Picture Password Lockscreen Keeps Your Android Phone Secure, May Be the Last Lock Screen You Ever Install", http://www.lifehacker.com, Nov. 2, 2012 (5 pages).

(Continued)

*Primary Examiner* — Darren B Schwartz
(74) *Attorney, Agent, or Firm* — William A. Kinnaman, Esq.; Kevin P. Radigan, Esq.; Heslin Rothenberg Farley & Mesiti P.C.

(57) ABSTRACT

A method is provided for controlling access to a protected resource in a computing system, which includes storing an indication of a selection of an access image type, receiving an access request for accessing the protected resource, and determining one or more access locations of an access grid of images, the access locations (and possibly the corresponding images) changing along a sequence of access requests. The method also includes generating the access grid to include corresponding access images of the access image type for the access locations and one or more other image types different from the access image type, displaying the access grid, and controlling the access to the protected resource according to a selection of one or more selected images in the access grid.

20 Claims, 6 Drawing Sheets

(56) References Cited

U.S. PATENT DOCUMENTS

| | | | | |
|---|---|---|---|---|
| 2007/0277224 | A1* | 11/2007 | Osborn | G06F 21/36 726/2 |
| 2009/0284344 | A1* | 11/2009 | Craymer | G06Q 20/341 340/5.54 |
| 2010/0325721 | A1 | 12/2010 | Bandyopadhyay et al. | |
| 2013/0047236 | A1* | 2/2013 | Singh | G06F 21/36 726/7 |
| 2013/0138968 | A1* | 5/2013 | Yudkin | G06F 21/602 713/183 |
| 2013/0139226 | A1* | 5/2013 | Welsch | G06F 21/30 726/4 |
| 2013/0276100 | A1* | 10/2013 | Yi | G06F 21/36 726/19 |
| 2014/0013416 | A1* | 1/2014 | Chae | G06F 21/36 726/16 |
| 2014/0043243 | A1* | 2/2014 | Methenitis | G06F 21/31 345/173 |
| 2014/0165186 | A1* | 6/2014 | Ramu | G06F 21/31 726/19 |
| 2014/0289843 | A1* | 9/2014 | Chiang | G06F 3/04883 726/19 |
| 2014/0315519 | A1* | 10/2014 | Nielsen | H04W 12/06 455/411 |
| 2015/0012859 | A1* | 1/2015 | Shin | G06F 3/0488 715/769 |
| 2015/0089664 | A1* | 3/2015 | Lee | G06F 21/36 726/27 |
| 2015/0091811 | A1 | 4/2015 | Hombert | |
| 2015/0123925 | A1* | 5/2015 | Qin | G06F 21/31 345/173 |
| 2016/0042171 | A1* | 2/2016 | Murai | G06F 21/36 726/19 |
| 2016/0283710 | A1* | 9/2016 | Kwon | G06F 3/04883 |
| 2017/0032113 | A1* | 2/2017 | Tunnell | G06F 21/316 |
| 2017/0318019 | A1* | 11/2017 | Gordon | G06K 9/00617 |
| 2017/0325093 | A1* | 11/2017 | Jenkins | H04W 12/08 |

OTHER PUBLICATIONS

Bobleanta, Vlad, "Apple Wants You to Unlock Your IPhone, IPad, or Mac Using Image Identification", http://www.unwiredview.com, Feb. 7, 2013, (3 pages).

\* cited by examiner

Selected locations

FIG. 1C

Selected locations

ACCESS CONTROL TO PROTECTED RESOURCE BASED ON IMAGES AT CHANGING LOCATIONS IDENTIFIABLE BY THEIR TYPE

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The present disclosure relates to the information technology field. More specifically, this disclosure relates to the control of access to protected resources.

Control of access to resources to be protected for security reasons is a significant issue in computing systems. A typical example is a portable computing device, such as a smartphone. In this case, a protection process may be used to lock the smartphone when it is not in operation; and the protection process then requires specific actions to unlock the smartphone, in order to resume its normal operation. The protection process is based on a secret, i.e., a piece of information that is known only to an authorized user. In this way, it is possible to prevent (or at least to hinder) unauthorized persons to get access to the smartphone (for example, when it is stolen or lost) and then to any sensitive data that may be stored therein.

The protection process may be of different types. A conventional approach is based on a secret password (or PIN) to be typed. Alternatively, the protection process (especially when a touch-screen is available) may be based on a gesture to be performed on a picture. A number of possibilities are practicable for this purpose.

For example, the protection process may require the drawing of a secret path, such as by connecting points in a grid.

The protection process may require the selection of a secret sequence of portions/zones within an image; in addition, the protection process may require the execution of a secret movement or sequence of movements.

The protection process may require the movement of secret pieces of an image to secret locations.

The protection process may show a picture and a grid of random numbers, and then it may require the dragging of a secret number on top of a secret spot of the picture.

The protection process may display an image (selected randomly within a set) and requires the identification of an object or a person inside the image (such as by its name).

The protection process may require an initialization phase wherein the user populates images with metadata based on a self-knowledge (for example, middle names or anniversary dates of persons, visiting dates of locations). In use, the protection process displays a plurality of images of a specific category (predetermined by the user or selected randomly); at the same time, the protection process displays a specific criterion for selecting the images in a required order (predetermined by the user or selected randomly as well) based on their metadata (for example, in ascending or descending order of names/dates).

Nevertheless, the protection process is generally susceptible of further improvements.

Indeed, the secret may be difficult to remember or, conversely, easy to discover.

Moreover, the protection process may be subject to several attacks, such as shoulder-surfing attacks, brute-force attacks and surface analysis attacks; particularly, the secret may be caught by snooping behind the user (for example, in public environments, especially when they are very crowded), the secret may be hacked by performing repeated unlocking attempts automatically and the secret may by discovered by looking for corresponding finger greases, respectively.

The protection process may require relatively long operations to initialize it; and the protection process may also require the storing of a relatively large amount of information for its operation.

Moreover, the protection process may require a relatively complex reasoning. This may be difficult and time consuming for the user, thereby making the protection process awkward in practice.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

Shortcomings of the prior art are overcome and additional advantages are provided through the provision, in one or more aspects, of a method for controlling access to a protected resource of a computing system. The method includes storing an indication of a selection of an access image type among a plurality of image types, receiving an access request for accessing the protected resource, and determining one or more access locations among a plurality of locations of an access grid of images in response to the access request, the access locations changing along a sequence of access requests. Further, the method includes generating the access grid to include corresponding access images of the access image type for the access locations and corresponding other images of one or more other image types different from the access image type, as well as displaying the access grid, and controlling the access to the protected resource according to a selection of one or more selected images in the access grid by granting the access to the protected resource base on the selected images matching the access images, otherwise denying the access to the protected resource.

Computer program products and systems relating to one or more aspects are also described and claimed herein.

Additional features and advantages are realized through the techniques disclosed herein. Other embodiments and aspects of the invention are described in detail herein and are considered a part of the claimed aspects.

BRIEF DESCRIPTION OF THE DRAWINGS

The solution of the present disclosure, as well as further features and the advantages thereof, will be best understood with reference to the following detailed description thereof, provided by way of example, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation), in which.

DETAILED DESCRIPTION

With reference in particular to FIGS. 1A-1D, the general principles are shown of the solution according to one or more aspects of the present invention.

Figure 1A:
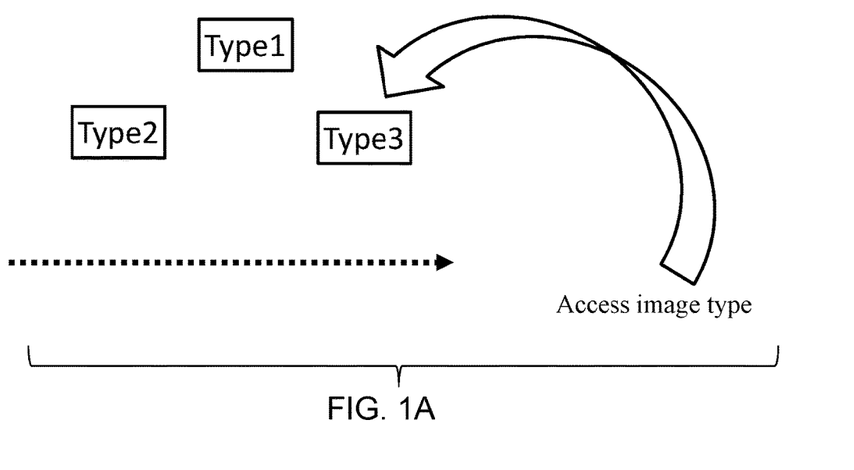
FIGS. 1A-1D show certain general principles of a process, according to one or more aspects of the present invention.

Starting from FIG. 1A, a plurality of images are used for controlling access to a protected resource in a computing system (for example, stored in a smartphone for locking/unlocking it). The images are organized in a plurality of image types (for example, animals, cities, cars as indicated by tags associated therewith). An (authorized) user of the smartphone selects an access image type (or more) among the available image types (for example, during an initialization phase of the smartphone), which access image type defines a secret to be used for unlocking the smartphone.

Figure 1B:
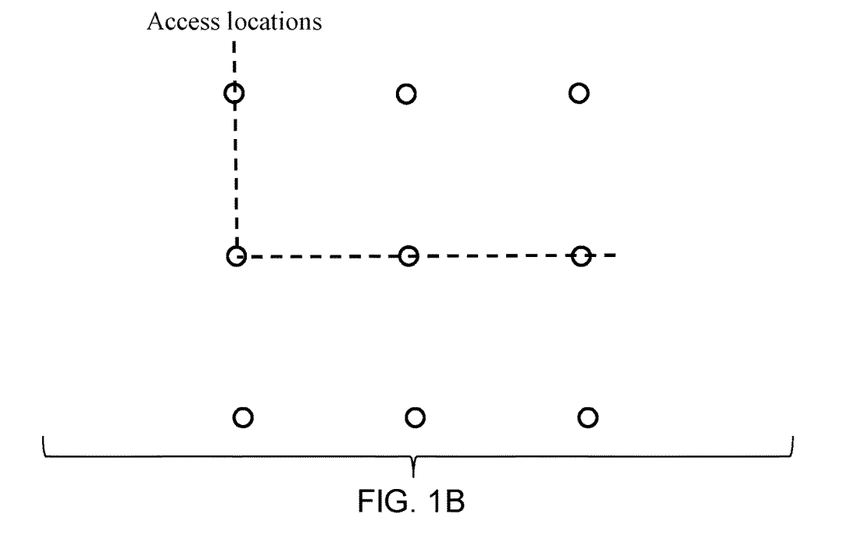

Moving to FIG. 1B, whenever an access to the (locked) smartphone is required for using it, a corresponding access request is submitted to the smartphone (for example, by pressing a switching button thereof). In response thereto, one or more access locations (for example, an access path) are determined in an access grid of images (for example, a matrix of 3 rows×3 columns); the access locations are determined so as to change along a sequence of access requests (for example, randomly).

Figure 1C:
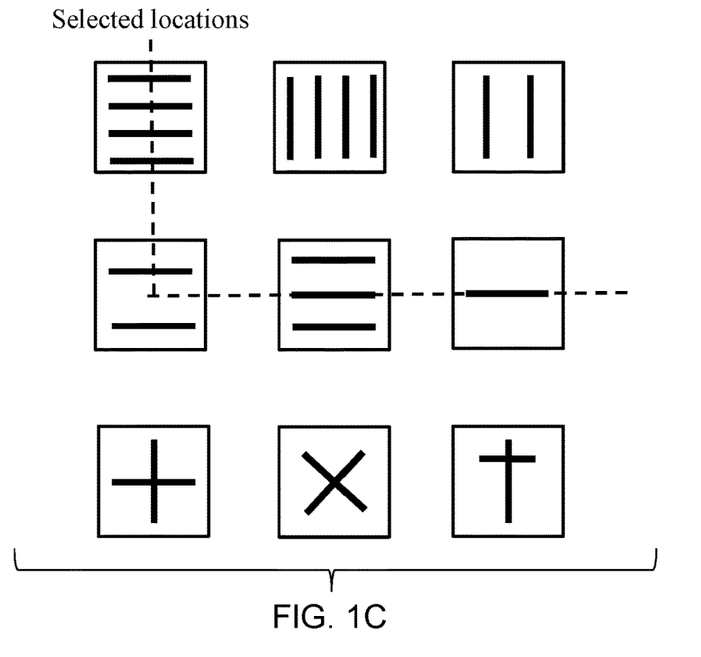

Moving to FIG. 1C, the access grid is then generated; the access grid comprises corresponding access images of the access image type for the access locations and corresponding other images of one or more other image types, different from the access image type (for example, selected randomly among the available images). At this point, the access grid is displayed (for example, on a touch-screen of the smartphone). Particularly, in the very simple scenario of the figure, the access images consist of horizontal lines and the other images consist of vertical lines and crosses.

The access to the smartphone is then controlled according to a selection of one or more selected images in the access grid (for example, by swiping a finger along them on the touch-screen). Particularly, the smartphone is unlocked (thereby granting access thereto) when the selected images match the access images; otherwise, the smartphone remains locked (thereby denying the access thereto). In this way, the smartphone may be unlocked by its user, whereas this is impossible (or at least very difficult) for any other (unauthorized) persons; indeed, only the user (knowing the access image type) may identify the access images in the access grid even if s/he does not know the access locations.

Figure 1D:
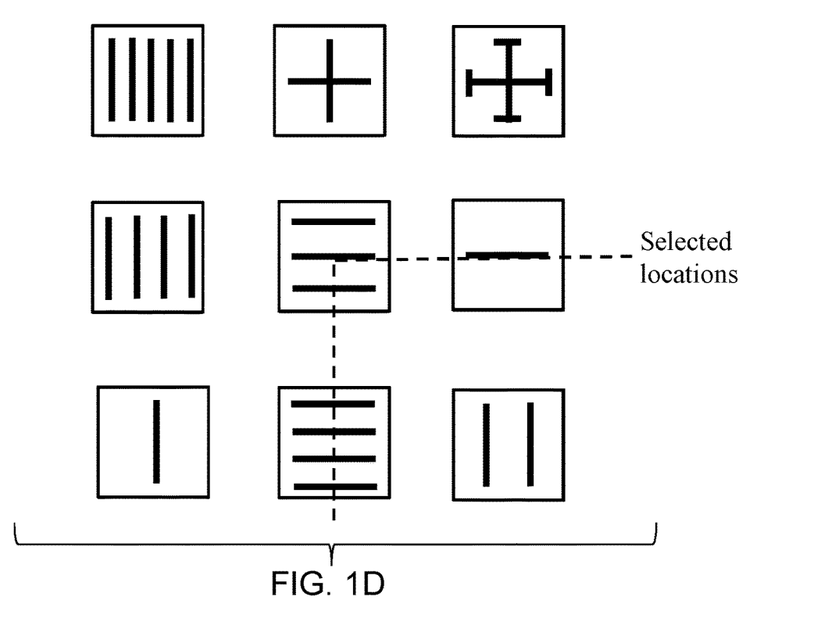

Moving to FIG. 1D, the same operations are repeated at any next access request to the smartphone. However, as indicated above, the access locations (and possibly the images in the access grid) will be generally different. As above, only the user (knowing the access image type) may identify the access images in the access grid even if the access locations have changed.

The above-described protection process is very safe. Indeed, the secret required to unlock the smartphone is a single piece of information defined by the access image type only; therefore, this secret is very easy to remember by the user. Nevertheless, the access locations (wherein the access images are to be identified for unlocking the smartphone) may be very complex; indeed, the access locations may be determined in any way in any access grid (since the corresponding access images may always be identified thanks to the simple knowledge of the access image type).

Moreover, the continual changing of the access locations makes the protection process substantially resistant to many attacks. Particularly, the protection process is resistant to shoulder-surfing attacks; indeed, even if unauthorized persons should manage to catch the access locations that have been used to unlock the smartphone (by snooping behind the user), they would be unable to use them to unlock the smartphone later on, since the access locations will be different. The protection process is resistant to brute-force attacks; indeed, only a single attempt to unlock the smartphone is possible for each access grid. The protection process is resistant to surface analysis attacks; indeed, finger greases are distributed substantially uniformly throughout the whole access grid.

The protection process is very simple to initialize, since it only requires selecting the access image type; the protection process also requires a single piece of information in association with the images (to define their image types).

The protection process is very easy to use. Indeed, the access locations may be identified in a very simple way and in a short time (without requiring any complex reasoning), by merely looking for the access images belonging to the access image type.

Figure 2:
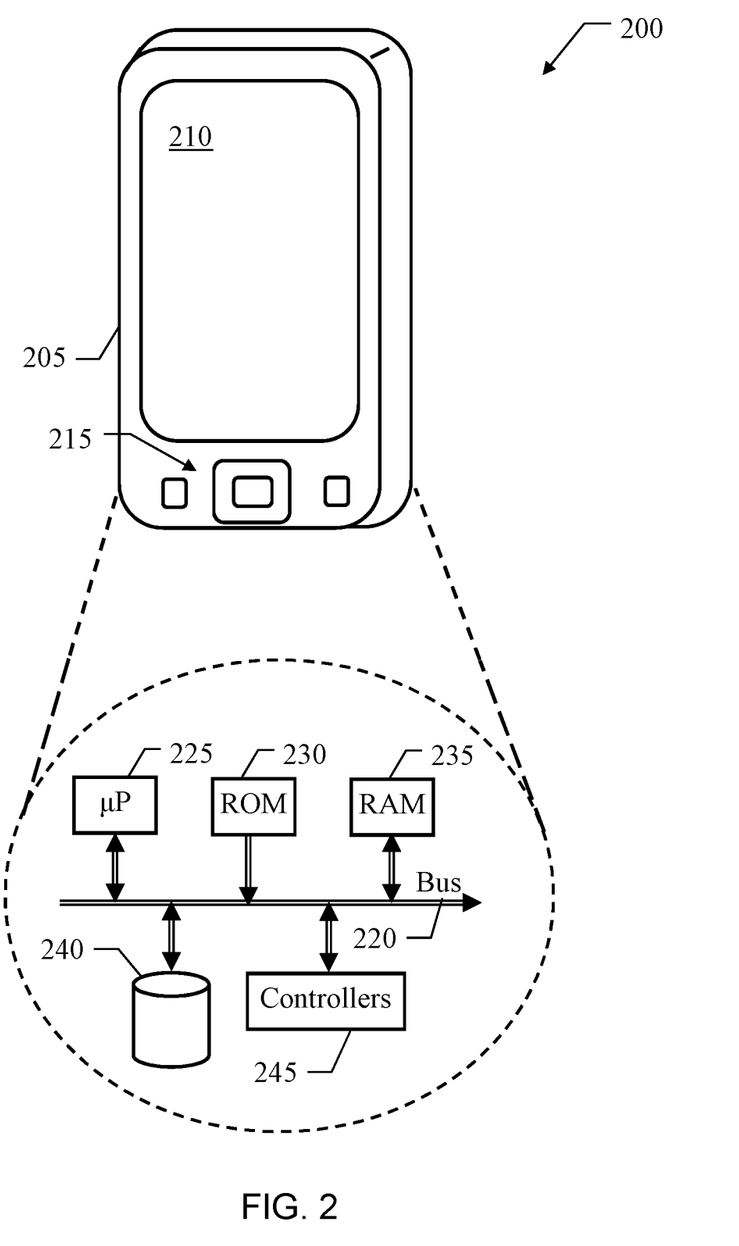
FIG. 2 shows a schematic block diagram of a computing system wherein an access control process according to one or more aspects of the present invention may be practiced.

With reference now to FIG. 2, a schematic block diagram is shown of a computing system 200 wherein a process according to one or more aspects of the present disclosure may be practiced.

The computing system 200 (by way of example only) is a smartphone (i.e., a mobile computing device that combines features of a mobile telephone with features of a personal computer). The smartphone 200 includes a case 205, which houses the electronic circuits controlling its operation; the case 205 integrates a touch-screen 210 (for displaying information and entering commands) and one or more control buttons 215. The electronic circuits of the smartphone 200 include several units that are connected among them through a bus structure 220 (with one or more levels). Particularly, one or more microprocessors (μP) 225 control operation of the smartphone 200; a non-volatile memory (ROM) 230 stores basic code for a bootstrap of the smartphone 200 and a volatile memory (RAM) 235 is used as a working memory by the microprocessors 225. The smartphone is provided with a mass-memory 240 for storing programs and data (for example, a flash E2PROM). Moreover, the smartphone 200 has a number of controllers 245 for corresponding peripheral, or Input/Output (I/O), units; for example, the peripheral units of the smartphone 200 comprise, in addition to the touch-screen 210, a mobile telephone transceiver (TX/RX), a camera, a loudspeaker, a microphone, a WNIC of the Wi-Fi type, a Bluetooth transceiver, a GPS receiver and an accelerometer (not shown in the figure).

Figure 3:
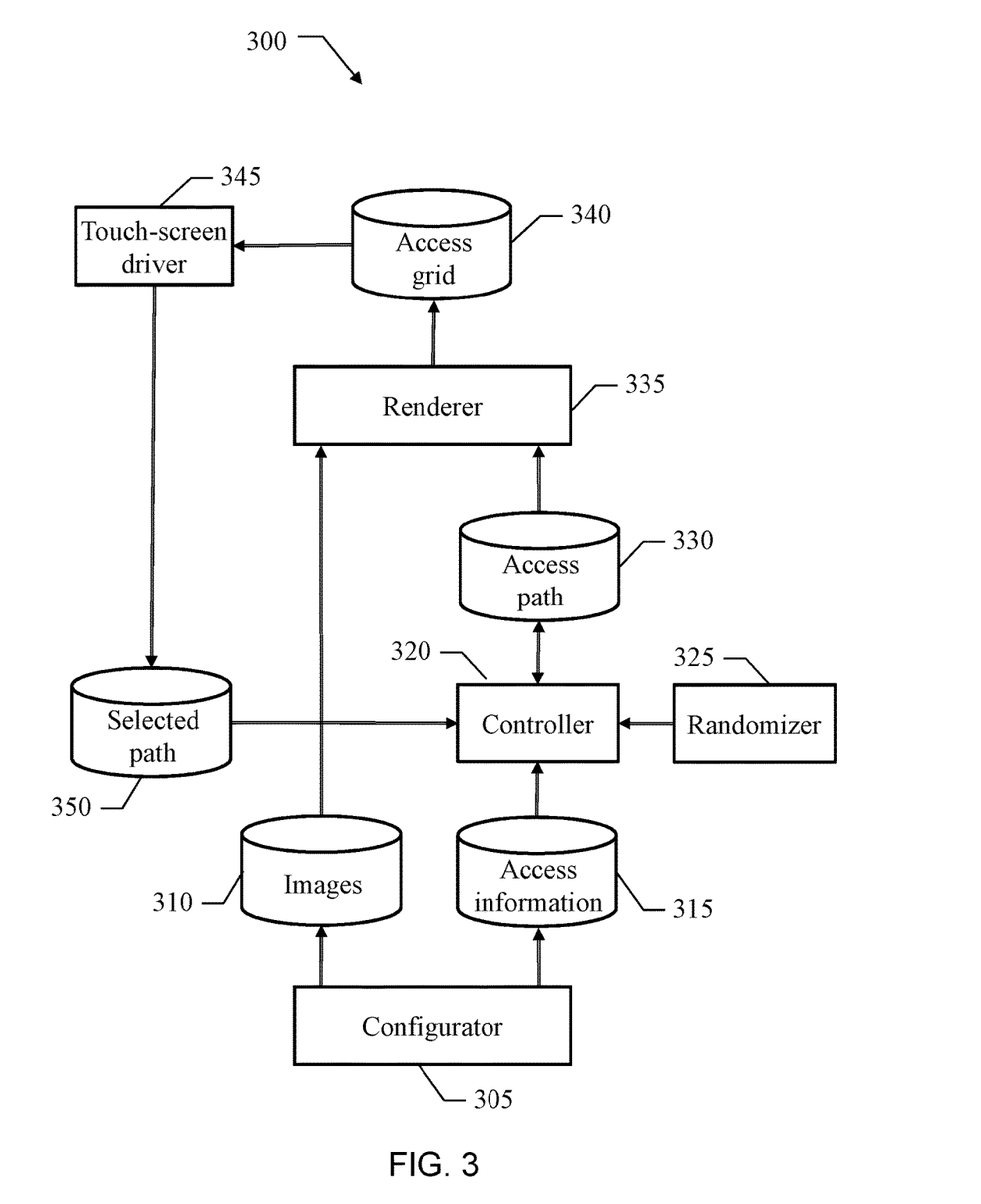
FIG. 3 depicts one embodiment of software components that may be used to implement an access control process, according to one or more aspects of the present invention.

With reference now to FIG. 3, certain software components are shown that may be used to implement an access control process, according to one or more aspects of the present invention.

The software components (programs and data) are denoted as a whole with the reference 300. The software components are typically stored in the mass memory and loaded (at least partially) into the working memory of the smartphone when the programs are running. The programs are pre-installed into the mass memory or they are installed later on, for example, from the Internet. In this respect, each program may be a module, segment or portion of code, which includes one or more executable instructions for implementing the specified logical function.

For example, the software components 300 are integrated in an operating system of the smartphone. Particularly, a configurator 305 is used to configure the smartphone for controlling the access thereto. The configurator 305 accesses (in read/write mode) an image repository 310 and an access information repository 315. The image repository 310 stores images that are available for controlling the access to the smartphone; each image is associated with a tag, which indicates its image type. Moreover, the image repository 310 stores a classification tree; the classification tree organizes the image types (or sub-categories) into image classes (or categories). For example, the image classes may be animals, cities, mountains, watches, faces and vehicles; the image types for the animals may be mammals, fish, birds, reptiles, and insects, and the image types for the vehicles may be cars, motorcycles, trucks, buses, trains, airplanes. The access information repository 315 stores access information that is used for controlling the access to the smartphone. Particularly, the access information includes the access image type to be used for generating the access grid at each access request to the smartphone, and an access direction of the corresponding access path (for example, defined by a first direction and a second direction among downwards/upwards and leftwards/rightwards). The access information may also include one or more access actions to be performed on the access grid in correspondence to the access path (for example, draw a circle, a square or a cross). Each access action is associated with an action rule, which is used to determine one or more action (access) locations along the access path; for example, the action rule may indicate one or more relative positions along the access path (such as first, second, last but one, last, even, odd) and/or one or more image characteristics of its access images (for example, a specific background color, hair/skin color, brand).

A controller 320 is used to determine the access path at each access request to the smartphone and to control the access to the smartphone accordingly. The controller 320 accesses (in read mode) the access information repository 315. The controller 320 exploits a randomizer 325; and the randomizer 325 is used to generate numbers in a pseudo-random way. The controller 320 accesses (in read/write mode) an access path variable 330; where the access path variable 330 stores an indication of a current version of the access path (for example, defined by an ordered list of its access locations in the access grid, each one indicated by a corresponding pair of coordinates in the form row/column). A renderer 335 is used to generate the access grid at each access request to the smartphone. The renderer 335 accesses (in read mode) the image repository 310 and the access path variable 330. The renderer 335 accesses (in write mode) an access grid variable 340; where the access grid variable 340 stores an indication of a current version of the access grid (for example, defined by a pointer to the corresponding image for each location thereof). A touch-screen driver 345 is used to drive the touch-screen of the smartphone, particularly for controlling the access thereto. The touch-screen driver 345 accesses (in read mode) the access grid variable 345. Moreover, the touch-screen driver 345 accesses (in write mode) a selected path variable 350, which is also accessed (in read mode) by the controller 320. The selected path variable 350 stores an indication of a current version of the selected path that has been selected on the access grid at each access request to the smartphone; the selected path is defined by an ordered sequence of the (selected) images that have been touched in the access grid, for example, indicated by a list of the corresponding (selected) locations in the access grid as above. Moreover, the selected path variable 350 stores an indication of any (selected) actions that have been performed at the selected locations.

Figure 4A:
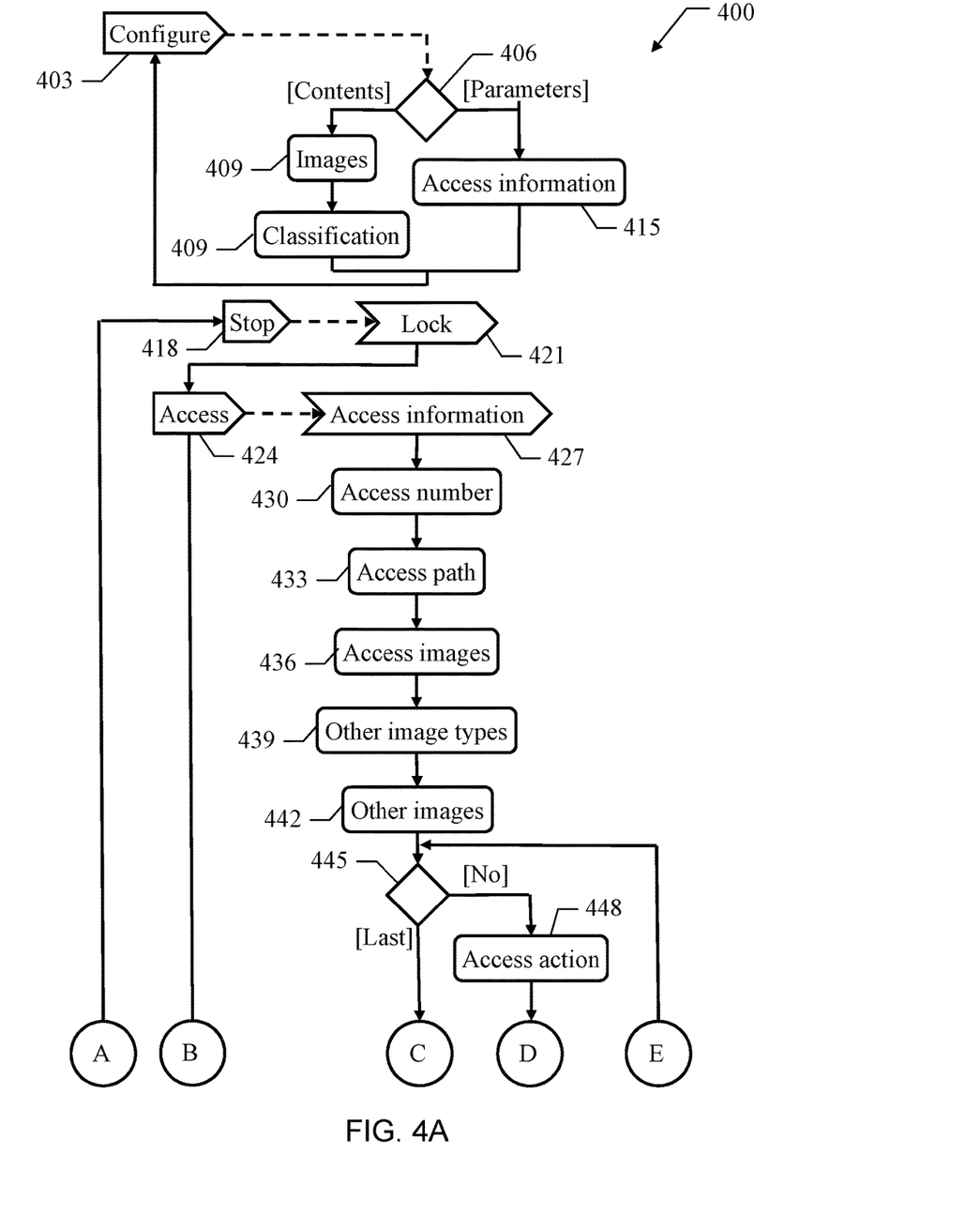
FIGS. 4A-4B illustrate one embodiment of a process of using an access control process, according to one or more aspects of the present invention.
Figure 4B:
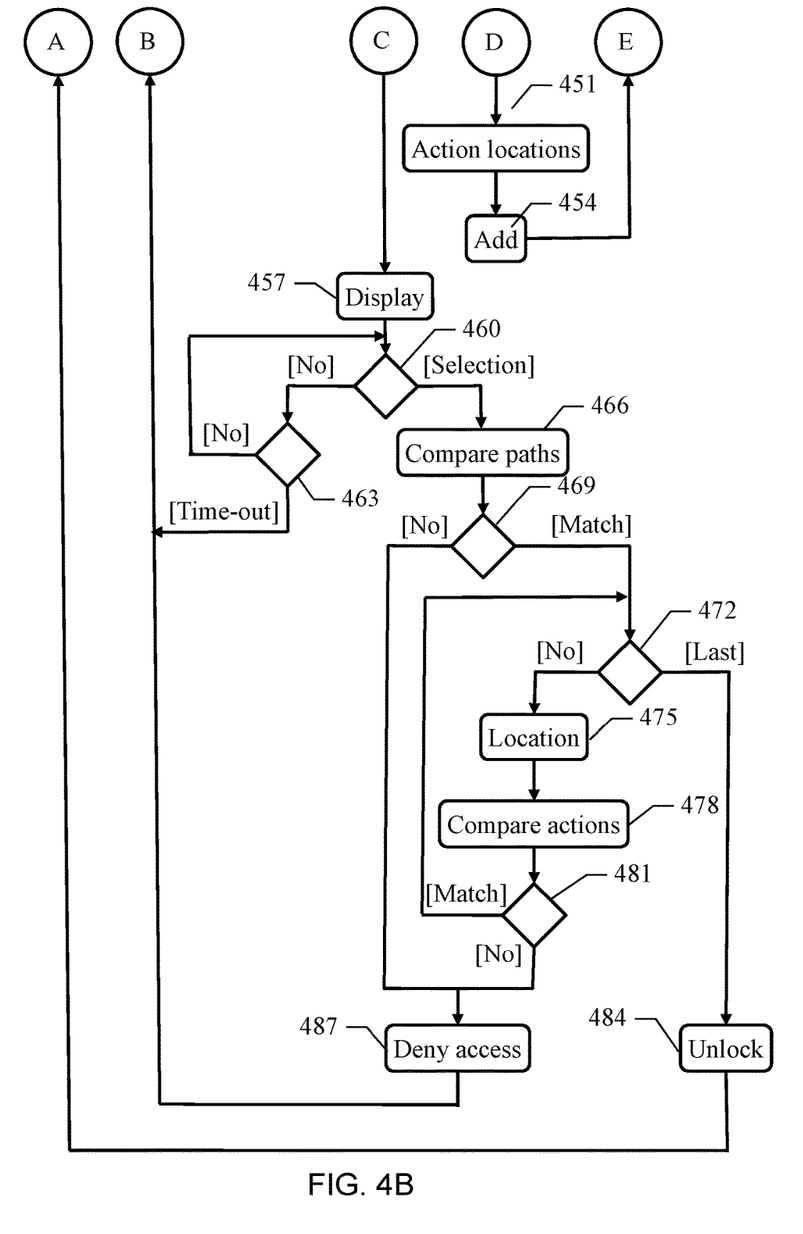

With reference now to FIGS. 4A-4B, an activity diagram is shown describing the flow of activities relating to an implementation of an access control process according to one or more aspects of the present invention.

Particularly, the diagram represents an exemplary process that may be used to control the access to the smartphone with a method 400. In this respect, each block may correspond to one or more executable instructions for implementing the specified logical function on the smartphone.

Particularly, the process passes from block 403 to block 406 every time the user of the smartphone submits a configuration request to the configurator (for example, by selecting a corresponding command). This operation is performed at least once during an initialization phase, and it may be repeated at any time later on. In response thereto, the flow of activity branches according to an option that has been selected by the user (for example, in a corresponding menu).

If the user has submitted a request for updating the contents that are used for controlling the access to the smartphone (in the image repository), the process descends into block 409; at this point, the user may change the image type of the images in the corresponding tags, may delete the images or may add (new) images with the corresponding image types. In the latter case, the user loads the new images (for example, from a personal gallery of pictures taken with the camera of the smartphone and while having the agreement of any people represented in the images) and assigns the corresponding image types thereto. In addition or in alternative, the user at block 412 may update the classification tree. For instance, the user may edit the image types/classes, may delete them, may add (new) images types/classes and may change the organization of the image types/classes. In this way, it is also possible to define custom image types/classes with the corresponding images that are based on a personal knowledge of the user (for example, friends, relatives, visited places). As a result, the security of the protection process is further increased, since the images of the custom image types/classes are very likely to be recognized by the user only; this may be particularly advantageous when the user is a child (for example, by defining the access image type as preferred cartoon characters). The flow of activity then returns to the block 403 waiting for a next configuration request.

Referring back to block 406, if the user has submitted a request for updating the parameters used to control the access to the smartphone (in the access information repository), then the process instead descends into block 415. At this point, the user may define the access image type and the access direction (initialized to a null value). The user may also define the access actions with their action rules (none at the beginning). For instance, the user may edit the access actions, may delete them and may add (new) access actions. In this case as well, the flow of activity then returns to the block 403 waiting for a next configuration request.

In a completely independent way, the process passes from block 418 to block 421 every time the operation of the smartphone is to be stopped; this may happen in response to a corresponding command that is submitted by the user (for example, by pressing a switching button of the smartphone) or automatically (for example, after a predetermined time of inactivity or as soon as a light sensor of the smartphone detects a dark condition likely to indicate its insertion into a pocket/bag). In response thereto, the controller locks the smartphone (by disabling the touch-screen driver so that it does not respond to any action thereon).

The process then descends into block 424 waiting for an access request to the smartphone (for example, by pressing its switching button again). In response thereto, the controller at block 427 retrieves the access information from the corresponding repository (i.e., the access image type, the access direction and any access actions with their action rules). Continuing to block 430, the controller determines an (access) number of the access locations, defining an (access) length of the corresponding access path; the access number is determined in a pseudo-random way (by exploiting the randomizer) so as to be between a minimum value (ensuring an acceptable level of security, such as 2-3) and a maximum value (compatible with a size of the access grid, such as 30-50% of a total number of the locations thereof). The controller then determines the access path at block 433 and saves it into the corresponding variable (by replacing its previous version). The access path is determined by selecting its access locations in a pseudo-random way (by exploiting the randomizer); the access locations are in the access number, start from a border of the access grid and are consecutive. In this way, the access path changes its length (in addition to its arrangement) continually; as a result, the security of the protection process is further increased, since the access path is still more difficult to identify.

At this point, the renderer generates the access grid and saves it into the corresponding variable (by replacing its previous version). Particularly, the renderer selects the access images (for the access locations) at block 436 (and saves corresponding pointers thereto into the access grid variable); the access images are selected in a pseudo-random way (by exploiting the randomizer) among the images of the access image type in the image repository. The renderer at block 439 determines one or more other image types, different from the access image type. The other image types are in a number No that is determined according to a total number of the locations of the access grid Ng and to the access number Na, so as to ensure that the images of each other image type are in a number comparable with the number of the access images, for example, No=CEILING ((Ng-Na)/Na) (wherein CEILING( )is a function that rounds its argument to the smallest integer not less than the argument). The other image types are selected in a pseudo-random way (by exploiting the randomizer) among the image types of the classification tree (in the image repository); and the other image types are selected among the image types of the same (access) image class of the access image type as far as possible, and then among all the remaining image types. The renderer then selects the other images (for the other locations of the access grid) at block 442 (and saves corresponding pointers thereto into the access grid variable); and the other images are selected in a pseudo-random way (by exploiting the randomizer) among the images of the other access types in the image repository (in the same number throughout the other image types and with the other images of each other image type in consecutive locations of the access grid as far as possible to mimic the distribution of the access images). Due to the above-mentioned determination of the number of the other image types, the images are distributed substantially uniformly among the different image types (access image type and other image types), so that the access images are more difficult to distinguish from the other images in the access grid. Moreover, due to the above-mentioned random selection of the images, they change continually, so that the access images are more difficult to identify in the access grid; particularly, in view of the above-mentioned selection of the other image types in the access image class, the other images are more difficult to distinguish from the access images in the access grid. All of the above (either alone or in combination) further increases the security of the protection process.

A loop is then entered for processing the access actions. The loop begins at block 445, wherein the renderer verifies whether any access actions are still to be processed. If so, at block 448 the renderer takes a (current) access action to be processed into account (in any arbitrary order). Continuing to block 451, the renderer determines any action locations associated with the access action according to its action rule. Particularly, when the action rule indicates one or more relative positions, the renderer identifies the action locations corresponding to these relative positions along the access path; conversely, when the action rule indicates one or more image characteristics, the renderer verifies whether each image along the access path matches these image characteristics (for example, according to corresponding metadata associated therewith). With reference now to block 454, the renderer adds an indication of the access actions associated with each access location to the access grid (in the corresponding variable). The process then returns to the block 445 to verify again whether any access actions are still to be processed. As soon as no access action remains to be processed (always true when no access action is defined), the above-described loop is exited by descending into block 457. As a result, the security of the protection process is further increased, since the access locations, wherein the (unknown) access actions are to be performed for unlocking the smartphone, change continually.

At this point, the touch-screen driver displays the access grid (extracted from the corresponding variable) onto the touch-screen of the smartphone. The touch-screen driver then enters a waiting condition for any swiping on the touch-screen (by a finger along the access grid). Particularly, at block 460 the touch-screen driver verifies whether any swiping has been performed. If not, at block 463 the touch-screen driver verifies whether a time-out has expired from the display of the access grid (for example, 5-10 seconds). If so, the process returns to the block 424 (waiting for a next access request), with the smartphone that remains locked. Conversely, the process returns to the block 460 in an idle loop. Referring back to the block 460, the flow of activity descends into block 466 as soon as the touch-screen driver detects any swiping; in response thereto, the controller compares the selected path (defined by the selected images that have been touched during the swiping, as indicated in the selected path variable) with the access path. The flow of activity then branches at block 469 according to a result of this comparison. Particularly, if the selected path matches the access path (i.e., all and only the access locations have been touched along the access direction) a loop is entered for verifying the access actions.

The loop begins at block 472, wherein the controller verifies whether any locations (throughout the whole access grid) are still to be processed. If so, at block 475 the controller takes a (current) location to be processed into account (in any arbitrary order). Continuing to block 478, the controller compares any (selected) actions, which may have been performed during the swiping in correspondence to the location (as indicated in the selected path variable), with any access actions that may be associated with the same location (as indicated in the access grid variable). The flow of activity then branches according to a result of this comparison. Particularly, if the selected actions match the access actions (i.e., all and only the access actions have been performed), the process returns to the block 472 to verify again whether any locations are still to be processed.

As soon as all the locations have been processed (without finding any mismatch between the access actions and the selected actions), the controller unlocks the smartphone at block 481. The flow of activity then returns to the block 418 waiting for a next stop of the operation of the smartphone. Conversely, the process descends into block 487 from the block 469 when the selected path does not match the access path, since any access images have not been selected, the access images have not been selected along the access direction and/or one or more other images have been selected; and likewise, the process descends into the same block 487 from the block 481 as soon as any mismatch is found between the access actions and the selected actions, since any access actions have not been performed and/or any other actions different therefrom have been performed. In both cases, the controller denies the access to the smartphone (for example, by displaying an error message). The flow of activity then returns to the block 424 (waiting for a next access request), with the smartphone that remains locked.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling access to a protected resource in a computing system. However, the method may be used to control any access (for example, for using, reading, updating) to any hardware/software/logic/physical protected resource (for example, a smartphone, a database, an account, a door, a safe) in any computing system (for example, consisting of the same protected resource, hosting it, controlling it).

In an embodiment, the method includes storing an indication of a selection of an access image type among a plurality of image types. However, the image types may be in any number and of any type (for example, organized in a single level or multiple levels); any number of access image types may be selected among them in any way (for example, statically during a configuration phase and/or dynamically when the protected resource is locked).

In an embodiment, the method includes receiving an access request for accessing the protected resource. However, the access request may be of any type and it may be received in any way (for example, by pressing a button, submitting a command, requesting a remote access).

In an embodiment, the method includes determining one or more access locations among a plurality of locations of an access grid of images in response to the access request. However, the access grid may be of any type (for example, a matrix or more generally any other 2D or 3D arrangement of any number of locations). Moreover, the access locations may be determined in any number (either fixed or variable) and in any way (for example, along a path of consecutive locations or separated among them, at least in part).

In an embodiment, the access locations change along a sequence of access requests. However, the access locations may be determined in any way, provided that they change substantially along the access requests, i.e., they do not generally repeat, at least for a minimum number of consecutive access requests, such as 10-100 (for example, pseudo-randomly or with a deterministic rule among a number of predefined possibilities).

In an embodiment, the method includes generating the access grid to include corresponding access images of the access image type for the access locations and corresponding other images of one or more other image types different from the access image type otherwise. However, the access grid may be generated in any way (for example, with the other image types and/or their number and with the access images and/or the other images that are fixed or selected either deterministically or randomly, with the images of each image type that are always all different among them or may repeat in part); and moreover, the images may be associated with their image types in any way (for example, by adding tags, storing the images in different folders corresponding to the image types).

In an embodiment, the method includes displaying the access grid. However, the access grid may be displayed in any way (for example, on a touch-screen, a standard monitor).

In an embodiment, the method includes controlling the access to the protected resource according to a selection of one or more selected images in the access grid. However, the selected images may be selected in any number and in any way (for example, by touching them with a finger, clicking on them with a mouse, typing corresponding identifiers with a keyboard).

In an embodiment, the method includes granting the access to the protected resource in response to the selected images matching the access images or denying the access to the protected resource otherwise. However, the matching may be determined in any way (for example, when the selected images are simply the same as the access images, when they are in the same order as well); and moreover, any operations may be performed when the access to the protected resource is denied (for example, simply leaving the protected resource locked, preventing a next attempt to access the protected resource for a predefined time, completely blocking the protected resource after a predefined number of consecutive denials of the access thereto).

In an embodiment, the method includes displaying the access grid on a touch-screen of a mobile computing device. However, the mobile computing device may be of any type (for example, a smartphone, a tablet); and moreover, the mobile computing device may have any touch-screen (for example, of capacitive or resistive type) or even a standard monitor.

In an embodiment, the method includes controlling an unlocking of the mobile computing device according to the selection of the selected images on the touch-screen. However, the selected images may be selected on the touch-screen in any way (for example, by swiping along them, touching them individually in succession).

In an embodiment, the access locations are consecutive along an access path in the access grid. However, the access path may be of any type (for example, always starting and/or finishing at a border of the access grid or at any position, with or without adjacent segments, crossing each location only once or with the possibility of returning to preceding locations one or more times).

In an embodiment, the method includes storing an indication of an access direction of the access path. However, the access direction may be of any type (for example, downwards, upwards, leftwards, rightwards or any combination thereof, clockwise or counter-clockwise).

In an embodiment, the method includes controlling the access to the protected resource according to a selection direction of the selected images, by granting the access to the protected resource in response to the selection direction matching the access direction or denying the access to the protected resource otherwise. However, the access to the protected resource may be controlled in any way (as above).

In an embodiment, the step of determining one or more access locations includes determining an access number of the access locations, with the access number that changes along the sequence of access requests. However, the access number may be determined in any way (provided that it changes substantially along the access requests as above) and within any range (from any minimum value down to one to any maximum value up to the total number of the locations of the access grid or even higher).

In an embodiment, the step of determining one or more access locations includes determining the access locations in a pseudo-random way. However, the access locations may be determined in any way (for example, with a deterministic causal process or even in a genuinely random way).

In an embodiment, the step of determining one or more access locations includes determining the access number in a pseudo-random way. However, the access number may be determined in any way (either the same or different with respect to the access locations).

In an embodiment, the step of generating an access grid includes determining a number of the other image types according to a total number of the locations and an access number of the access locations. However, the number of the other image types may be determined in any way (for example, with the number of the other image types that is fixed or variable, with the number of locations of each other image type that is fixed or variable).

In an embodiment, the step of generating an access grid includes selecting the access images and the other images among a plurality of images of the corresponding image types, the access images and/or the other images changing along the sequence of access requests. However, the images (of the access image type only, of each other image type only or of both of them) may be selected in any way (provided that they change substantially along the access requests as above) and within any sets of available images of the corresponding image types.

In an embodiment, the step of generating an access grid includes selecting the access images and the other images in a pseudo-random way. However, the images may be selected in any way (either the same or different with respect to the access locations and the access number).

In an embodiment, the method includes storing the indication of the selection of the image type among a plurality of image types of an access image class among a plurality of image classes. However, the image classes may be in any number and of any type (for example, organized in a single level or multiple levels); moreover, the access image types may be selected in any number of access image classes.

In an embodiment, the method includes selecting the other image types in the access image class. However, the other image types may be always all in the access image class, in the access image class as far as possible (according to their number) and then in other image classes or in any image classes (independently of the access image class).

In an embodiment, the method includes creating one or more custom image types of the image types. However, the custom image types may be in any number and of any type; in any case, the possibility of customizing the image types may be not available in a basic implementation.

In an embodiment, the method includes providing one or more custom images of said images. However, the custom images may be provided in any way (for example, acquired locally, downloaded remotely); and in any case, the custom images may be provided for all the image types, for the custom image types only or this possibility may be not available at all.

In an embodiment, the method includes storing an indication of one or more access actions with corresponding action rules for determining corresponding action locations among the access locations. However, the access actions may be in any number and of any type (down to none); moreover, the action locations may be defined by any action rules or they may even be fixed in the access grid.

In an embodiment, the method includes determining the action locations according to the corresponding action rules. However, the actions locations may be determined in any way (for example, by relative positions, image characteristics or any combination thereof) and in any number for each access action (one or more).

In an embodiment, the method includes controlling the access to the protected resource according to one or more selected actions in the access grid, by granting the access to the protected resource in response to the selected actions matching the access actions in the action locations or denying the access to the protected resource otherwise. However, the access to the protected resource may be controlled in any way (as above).

In an embodiment, the action rules indicate corresponding relative positions. In such a case, the step of determining the action locations includes determining the action locations at the corresponding relative positions in the access locations. However, the relative positions of each action rule may be in any number and defined in any way (for example, by a cardinality, one or more properties or any combination thereof).

In an embodiment, in addition, or in alternative, the action rules indicate corresponding image characteristics; in this case, the step of determining the action locations includes determining the action locations in response to a match of the corresponding image characteristics by the access images. However, the image characteristics of each action rule may be in any number and defined in any way (for example, by one or more contents, colors, views).

Generally, similar considerations apply if the same solution is implemented with an equivalent method (by using similar steps with the same functions of more steps or portions thereof, removing some steps being non-essential, or adding further optional steps); and moreover, the steps may be performed in a different order, concurrently or in an interleaved way (at least in part).

An embodiment provides a computer program configured for causing a computing system to perform the above-mentioned method when the computer program is executed on the computing system. An embodiment provides a computer program product, the computer program product including a computer readable storage medium having program instructions embodied therewith, the program instructions being executable by a computing system to cause the computing system to perform the same method. However, the computer program may be implemented as a stand-alone module (for example, a dedicated app), as a plug-in for a pre-existing computer program (for example, the operating system), or even directly in the latter; moreover, the computer program may run on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system including means configured for performing each of the steps of the above-mentioned method. An embodiment provides a system comprising a circuitry (i.e., any hardware suitably configured, for example, by software) configured for performing each of the steps of the same method. However, the system may be of any type (for example, any physical and/or virtual computing machine, either stand-alone or communicating with other computing machines via any local, wide area, global, cellular or satellite network and exploiting any type of wired and/or wireless connections).

By way of example, an embodiment includes a computing system for controlling access to a protected resource. The computing system includes, by way of example: a circuitry for storing an indication of a selection of an access image type among a plurality of image types; a circuitry for receiving an access request for accessing the protected resource; a circuitry for determining one or more access locations among a plurality of locations on an access grid of images in response to the access request, the access locations changing along a sequence of access requests; a circuitry for generating the access grid to include corresponding access images of the access image type for the access locations and corresponding other images for one or more other image types different from the access image type; a circuitry for displaying the access grid; and a circuitry for controlling the access to the protected resource according to a selection of one or more selected images in the access grid by granting the access to the protected resource in response to selected images matching the access images or denying the access to the protected resource otherwise.

By way of further example, an embodiment is provided which includes a mobile computing device. The mobile computing device includes: a circuitry for storing an indication of a selection of an access image type among a plurality of image types; a circuitry for receiving an access request for unlocking the mobile computing device being locked; a circuitry for determining one or more access locations among a plurality of locations of an access grid of images in response to the access request, the access locations changing along a sequence of access requests; a circuitry for generating the access grid to include corresponding access images of the access image type for the access locations and corresponding other images of one or more other image types different from the access image type otherwise; a circuitry for displaying the access grid; and a circuitry for controlling the unlocking to the mobile computing device according to a selection of one or more selected images in the access grid by unlocking the mobile computing device in response to the selected images matching the access images or leaving the mobile computing device locked otherwise.

In one or more embodiments, the mobile computing device includes a touchscreen for displaying the access grid and for selecting the selected images.

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interactivity between different components generally does not need to be continual, and it may be either direct or indirect through one or more intermediaries.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In general terms, the present disclosure is based on the idea of using images at changing locations that may be identified by their type.

Particularly, an aspect provides a method for controlling access to a protected resource in a computing system, wherein an access grid is generated to comprise corresponding access images of an access image type for access locations (determined to change along a sequence of access requests to the protected resource) and corresponding other images of one or more other image types (different from the access image type) otherwise, and the access to the protected resource is granted in response to a selection of one or more selected images in the access grid matching the access images.

A further aspect provides a computer program for implementing the method.

A further aspect provides a corresponding computer program product.

A further aspect provides a corresponding system.

A further aspect provides a corresponding mobile computing device.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

Those skilled in the art will note that the above-described features may be combined in any way.

What is claimed is:

1. A method for controlling access to a protected resource in a computing system, the method comprising:
    storing an indication of a selection of an access image type for controlling access to the protected resource, the access image type being one of a plurality of image types stored in the computing system, the access image type being provided by a user of the protected resource, and the access image type to be displayed with one or more other image types of the plurality of image types when receiving future access requests to the protected resource;

receiving, by the computing system, an access request for accessing the protected resource;

determining, by a control of the computing system, an access path for accessing the protected resource, the determining being based on receiving the access request, and the determining including:

selecting, by the control exploiting a randomizer of the computing system, a number of access locations among a plurality of locations that will need to be selected by the user to access the protected resource, the plurality of locations to be displayed as an access grid of images on a touch-screen of the protected resource; and defining, by the control exploiting the randomizer, a position of each of the access locations among the plurality of locations to be displayed as the access grid of images;

generating, by a renderer of the computing system, the access grid of images, the access grid of images comprising a plurality of images retrieved from the computing system, the plurality of images to comprise a number of access images of the access image type, the number of the access images corresponding to the number of the access locations, and other images of one or more other image types different from the access image type located at locations not selected as the access locations of the plurality of locations;

displaying, by the computing system, the access grid on the touch-screen of the protected resource;

controlling the access to the protected resource according to a selection of one or more selected images in the access grid by granting the access to the protected resource based on the selected images matching the access images, otherwise denying the access to the protected resource; and repeating the receiving, determining, generating, displaying and controlling for another access request, and changing the access path, including the number of access locations in the access path, based on receiving the another access request, the changing the access path, at least in part, increasing security of the protected resource.

2. The method according to claim 1, wherein the method further comprises controlling an unlocking of the protected resource, the protected resource comprising a mobile computing device, the controlling the unlocking of the protected resource according to the selection of the selected images on the touch-screen.

3. The method according to claim 1, wherein the access locations are consecutive along an access path in the access grid.

4. The method according to claim 3, wherein the method further comprises:

storing an indication of an access direction of the access path; and controlling the access to the protected resource according to a selection direction of the selected images by granting the access to the protected resource in response to the selection direction matching the access direction, otherwise denying the access to the protected resource.

5. The method according to claim 1, wherein the selecting the number of the access locations comprises:

determining the number of the access locations in a pseudo-random way.

6. The method according to claim 1, wherein the defining the position of the access locations comprises:

determining the position of the access locations in a pseudo-random way.

7. The method according to claim 1, wherein said generating an access grid comprises:

determining a number of the other image types according to a total number of displayable locations on the access grid and the number of the access locations.

8. The method according to claim 1, wherein said generating an access grid comprises:

changing the access images and/or the other images based and on receiving another access request.

9. The method according to claim 8, wherein said generating an access grid comprises:

selecting the access images and the other images in a pseudo-random way.

10. The method according to claim 1, wherein the method comprises:

storing the indication of the selection of the image type among a plurality of image types of an access image class among a plurality of image classes, and selecting the other images from the access image class.

11. The method according to claim 1, wherein the method comprises:

creating one or more custom image types of said plurality of image types and/or providing one or more custom images.

12. The method according to claim 11, wherein the one or more custom images include pictures taken with a camera of the protected resource.

13. The method according to claim 1, wherein the method further comprises:

storing an indication of one or more access actions with corresponding action rules for determining corresponding action locations among the access locations;

determining the action locations according to the corresponding action rules; and controlling the access to the protected resource according to one or more selected actions in the access grid by granting the access to the protected resource in response to the selected actions matching the access actions in the action locations or denying the access to the protected resource otherwise.

14. The method according to claim 13, wherein the action rules indicate corresponding relative positions or image characteristics, said determining the action locations comprising:

determining the action locations at the corresponding relative positions in the access locations or in response to a match of the corresponding image characteristics by the access images.

15. A computer program product, the computer program product comprising:

a computer readable storage medium having program instructions embodied therewith, the program instructions being executable by a computing system to cause the computing system to perform a method for controlling access to a protected resource, the method comprising:

storing an indication of a selection of an access image type for controlling access to the protected resource, the access image type being one of a plurality of image types stored in the computing system, the access image type being provided by a user of the protected resource, and the access image type to be displayed with one or more other image types of the plurality of image types when receiving future access requests to the protected resource;

receiving, by the computing system, an access request for accessing the protected resource;

determining, by a control of the computing system, an access path for accessing the protected resource, the determining being based on receiving the access request, and the determining including:

selecting, by the control exploiting a randomizer of the computing system, a number of access locations among a plurality of locations that will need to be selected by the user to access the protected resource, the plurality of locations to be displayed as an access grid of images on a touch-screen of the protected resource; and defining, by the control exploiting the randomizer, a position of each of the access locations among the plurality of locations to be displayed as the access grid of images;

generating, by a renderer of the computing system, the access grid of images, the access grid of images comprising a plurality of images retrieved from the computing system, the plurality of images to comprise a number of access images of the access image type, the number of the access images corresponding to the number of the access locations, and other images of one or more other image types different from the access image type located at locations not selected as the access locations of the plurality of locations;

displaying, by the computing system, the access grid on the touch-screen of the protected resource;

controlling the access to the protected resource according to a selection of one or more selected images in the access grid by granting the access to the protected resource based on the selected images matching the access images, otherwise denying the access to the protected resource; and repeating the receiving, determining, generating, displaying and controlling for another access request, and changing the access path, including the number of access locations in the access path, based on receiving the another access request, the changing the access path, at least in part, increasing security of the protected resource.

16. The computer program product of claim 15, wherein the method further comprises controlling an unlocking of the protected resource, the protected resource comprising a mobile computing device, the controlling the unlocking of the protected resource according to the selection of the selected images on the touch-screen.

17. The computer program product of claim 15, wherein the access locations are consecutive along an access path in the access grid.

18. The computer program product of claim 17, wherein the method further comprises:

storing an indication of an access direction of the access path; and controlling the access to the protected resource according to a selection direction of the selected images by granting the access to the protected resource in response to the selection direction matching the access direction, otherwise denying the access to the protected resource.

19. A computing system for controlling access to a protected resource, the computing system comprising:

a processor, wherein the computing system performs a method comprising:

storing an indication of a selection of an access image type for controlling access to the protected resource, the access image type being one of a plurality of image types stored in the computing system, the access image type being provided by a user of the protected resource, and the access image type to be displayed with one or more other image types of the plurality of image types when receiving future access requests to the protected resource;

receiving, by the computing system, an access request for accessing the protected resource;

determining, by a control of the computing system, an access path for accessing the protected resource, the determining being based on receiving the access request, and the determining including:

selecting, by the control exploiting a randomizer of the computing system, a number of access locations among a plurality of locations that will need to be selected by the user to access the protected resource, the plurality of locations to be displayed as an access grid of images on a touch-screen of the protected resource; and defining, by the control exploiting the randomizer, a position of each of the access locations among the plurality of locations to be displayed as the access grid of images;

generating, by a renderer of the computing system, the access grid of images, the access grid of images comprising a plurality of images retrieved from the computing system, the plurality of images to comprise a number of access images of the access image type, the number of the access images corresponding to the number of the access locations, and other images of one or more other image types different from the access image type located at locations not selected as the access locations of the plurality of locations;

displaying, by the computing system, the access grid on the touch-screen of the protected resource;

controlling the access to the protected resource according to a selection of one or more selected images in the access grid by granting the access to the protected resource based on the selected images matching the access images, otherwise denying the access to the protected resource; and repeating the receiving, determining, generating, displaying and controlling for another access request, and changing the access path, including the number of access locations in the access path, based on receiving the another access request, the changing the access path, at least in part, increasing security of the protected resource.

20. The computing system of claim 19, wherein the method further comprises controlling an unlocking of the protected resource, the protected resource comprising a mobile computing device, the controlling the unlocking of the protected resource according to the selection of the selected images on the touch-screen.

* * * * *